United States Patent [19]

Price et al.

[11] 3,716,949

[45] Feb. 20, 1973

[54] FEED RATE AND POSITIONING CONTROL SYSTEM FOR A MACHINE TOOL

[75] Inventors: Ralph E. Price; Stanley C. Schoonover, both of Waynesboro, Pa.

[73] Assignee: Landis Tool Company

[22] Filed: June 12, 1970

[21] Appl. No.: 45,829

[52] U.S. Cl. .................................. 51/165.8, 318/571
[51] Int. Cl. ............................................. B24b 49/10
[58] Field of Search ........ 51/165 TP, 165.71, 165.77, 51/165.8, 165.9, 165.91, 165.92, 49; 318/571, 696

[56] References Cited

UNITED STATES PATENTS

| | | | |
|---|---|---|---|
| 2,657,505 | 11/1953 | Price | 51/165.8 |
| 2,875,390 | 2/1959 | Tripp | 318/571 X |
| 2,922,940 | 1/1960 | Mergler | 318/571 |
| 2,961,808 | 11/1960 | Dunigan | 51/165.92 |
| 3,002,115 | 9/1961 | Johnson et al. | 318/571 |
| 3,056,240 | 10/1962 | Morgan et al. | 51/165 TP |
| 3,110,865 | 11/1963 | Scuitto | 318/571 X |
| 3,344,559 | 10/1967 | Inaba et al. | 51/165 TP X |
| 3,353,302 | 11/1967 | Lowy | 51/49 |
| 3,372,517 | 3/1968 | Sokabe et al. | 51/165.8 |
| 3,467,899 | 9/1969 | Inaba et al. | 318/571 X |
| 3,503,158 | 3/1970 | Robillard et al. | 51/165.8 |
| 3,541,417 | 11/1970 | Frank | 318/571 |

*Primary Examiner*—Harold D. Whitehead
*Attorney*—Diller, Brown, Ramik & Holt

[57] ABSTRACT

A feed rate and positioning control system for a machine tool is described which utilizes an electrohydraulic pulse motor to move a grinding wheel support at preselected rates and for predetermined distances during a grinding operation. A control counter is arranged, via rate selecting switches, to select pulses of various predetermined pulse repetition rates for controlling the rates at which the electrohydraulic pulse motor moves during a grinding operation. End point selecting switches and comparators are provided for determining the distances moved by the support during a grinding operation to signal the control counter to change rates or to start a dwell period. Dwell selecting switches, responsive to the control counter, are provided to establish the duration of dwell periods between application of selected rates and to signal the control counter at the end of each dwell period, including a spark out period at the end of the grinding operation.

14 Claims, 6 Drawing Figures

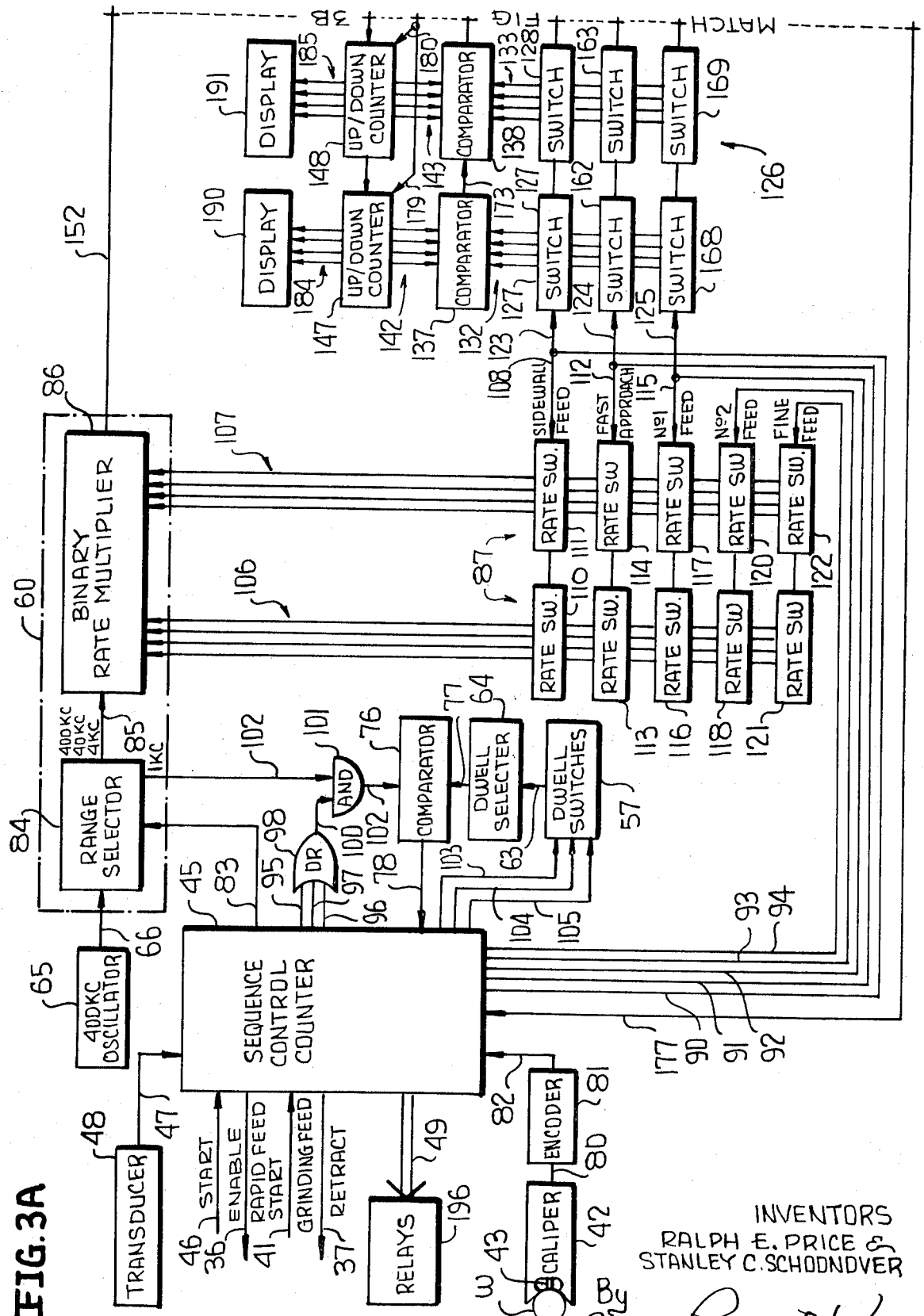

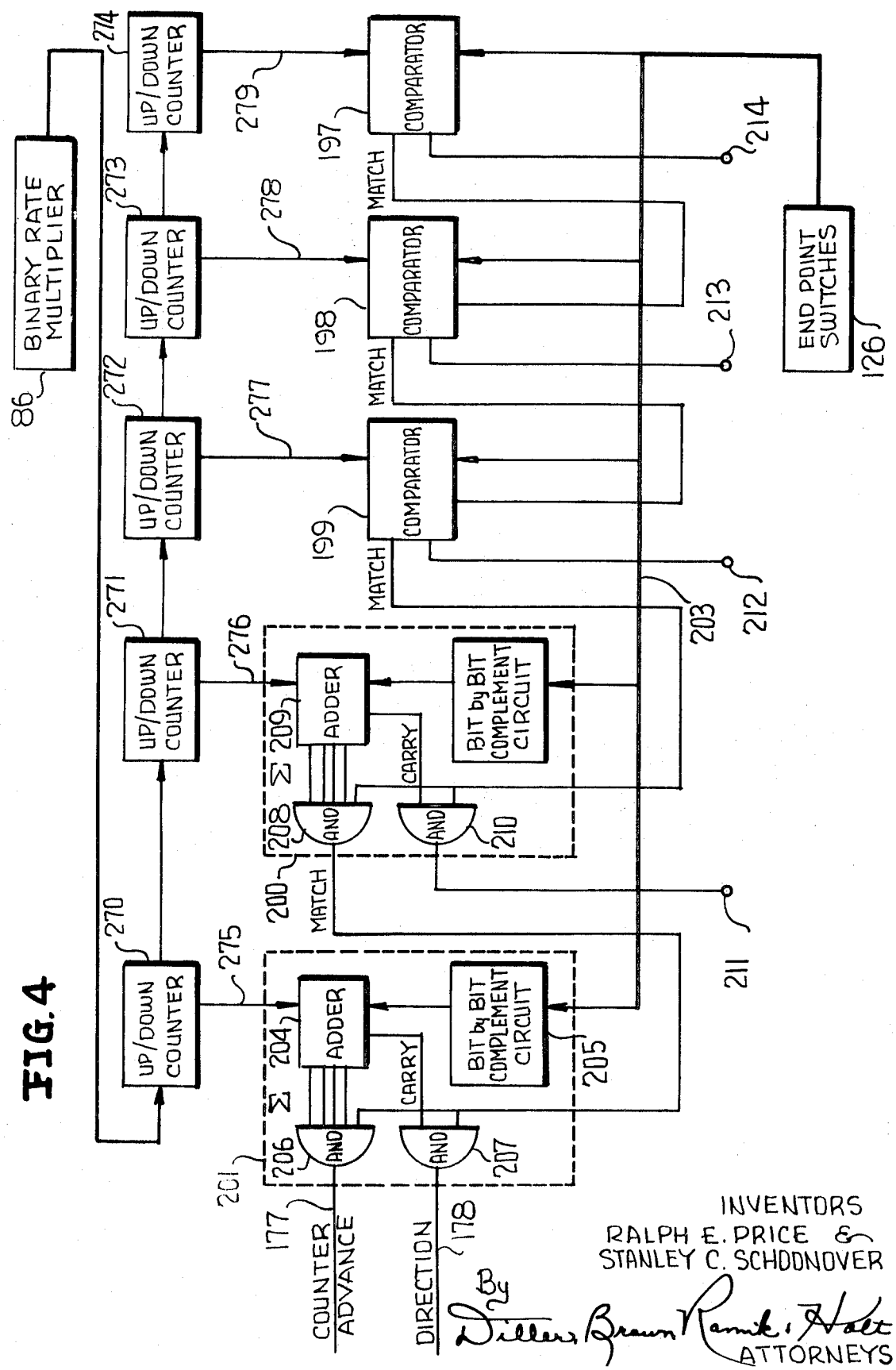

FEED RATE AND POSITIONING CONTROL SYSTEM FOR A MACHINE TOOL

This invention relates in general to new and useful improvements in a feed rate and positioning control system for providing variable feed rate signals and positioning signals for a machine tool element. In particular, the invention relates to a control system which utilizes an electro-hydraulic pulse motor to move a machine element in accordance with a predetermined programmed cycle of operation.

In many prior art arrangements, a single grinding feed rate was used for essentially all diameters of a workpiece until an increment feed or fine feed rate was effected just before feed completion.

It has been proposed to arrange a grinder for grinding workpieces, having two or more different diameters, with a control arrangement which includes a punched card or the like for preselecting the feed rate and work speed for each diameter.

In accordance with the present invention, means are provided for controlling the feed rate and/or position of a machine tool element; e.g., a grinding wheel support of a grinding machine. The machine tool element is advanced, by an electro-hydraulic pulse motor, at a variable feed rate and for predetermined distances during a cycle of operation for grinding a workpiece diameter automatically. The apparatus for actuating a machine element to a predetermined cycle of operation, in accordance with one aspect of the invention, includes an input means for the pulse motor comprising means for providing pulses of different repetition rates, and means for selectively applying pulses of one or more of the different repetition rates to the pulse motor. This particular arrangement is effective to move the machine element at a selected rate or rates through the predetermined cycle of operation. In accordance with another aspect of the present invention, an input means for the pulse motor is provided which comprises means for providing pulses of different repetition rates, and means for selectively applying one or more of said pulses of one or more of the different repetition rates to the pulse motor. Thus, the machine element may be moved a predetermined distance depending on the number of the pulses applied to the pulse motor.

It is desirable, in grinding a workpiece having diameter portions to be ground, that a production tool be automatically adjusted rapidly so that the in-feed rate during a plunge grinding operation be somewhat proportional to the remaining stock of the workpiece which is to be removed during a grinding operation.

It is also desirable, in grinding a workpiece, that a production tool be capable of halting the advance of a grinding element at precisely the moment when the workpiece has been ground to the desired diameter.

Further, it is desirable, in grinding a workpiece, that a production tool be automatically controlled, during a cycle of operation, to provide for dwell periods between the application of predetermined selected rate signals to a pulse motor which advances a machine element. Additionally, it is clearly desirable to provide a dwell period of predetermined length at the end of a grinding operation thereby providing a spark out function.

In accordance with the foregoing, it is an object of this invention in a machine tool to provide a pulse motor and input means operatively arranged for selectively applying pulses of one or more of a number of different repetition rates in the pulse motor so that the pulse motor may move a machine tool element, which may be a support for a grinding wheel, through a predetermined cycle of operation at a selected rate or rates.

It is another object of this invention in a machine tool to provide actuating means for a machine element which includes a pulse motor and an input means operatively arranged for selectively applying one or more pulses of one or more different repetition rates to the pulse motor so that the pulse motor can move the machine element, which may be a support for a grinding wheel, a predetermined distance or distances depending on the number of pulses applied to the pulse motor.

It is a further object of this invention in a machine tool to provide a pulse motor and input means operatively arranged for selectively applying one or more pulses of one or more of a number of different repetition rates to the pulse motor so that the pulse motor may move a machine tool element, which may be a support for a grinding wheel, through a predetermined cycle of operation at a selected rate or rates and for a predetermined distance or distances.

It is still a further object of this invention in a machine tool to provide means for actuating a machine tool element through a predetermined cycle of operation which includes means for providing dwell periods during the predetermined cycle of operation.

With the above and other objects in view, as will hereinafter appear, the nature and features of the invention will be more clearly understood by reference to the detailed description, the appended claims and the illustrations in the accompanying drawings in which like reference numerals denote like parts.

In the drawings:

FIGS. 3A and 3B are a block diagram of a control system for actuating an electro-hydraulic pulse motor in accordance with a preferred embodiment incorporating the present invention;

FIG. 4 is a block diagram of a comparator arrangement suitable for developing advance signals which may be utilized in the control system illustrated in FIGS. 3A and 3B.

Figure 1:
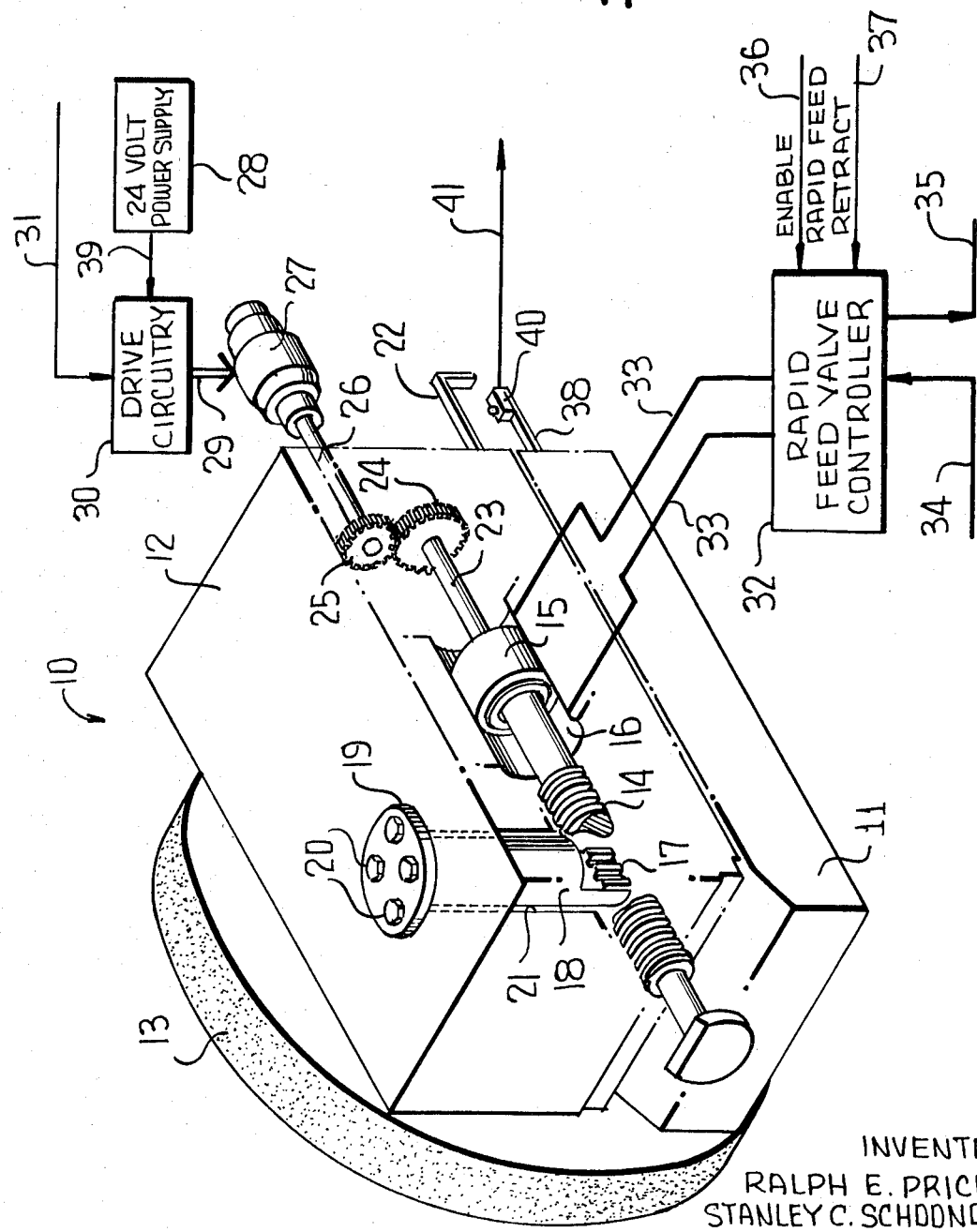
FIG. 1 is a perspective view of the feed mechanism for a grinding wheel support there being schematically illustrated a rapid feed valve controller and an electro-hydraulic pulse motor with its associated drive circuitry.

Referring now to the drawings in detail, it will be seen that there is illustrated in FIG. 1 a grinding machine which is generally referred to by the numeral 10. The grinding machine 10, as illustrated in FIG. 1, is of conventional construction and includes a bed 11. The bed 11 has mounted thereon in a conventional manner for longitudinal sliding movement, a work carriage or support (not shown) which is provided at opposite ends with a conventional type headstock and tailstock. A workpiece W, illustrated schematically in FIG. 2, may be mounted between the headstock and tailstock for rotation about a predetermined axis and for longitudinal shifting with the work support or carriage.

A grinding wheel support 12 is slidably mounted on the bed 11 for controlled transverse movement with respect to the work support (not illustrated) in a conventional manner. A grinding wheel 13 is carried by the wheel support 12 for rotation. The grinding wheel 13 is driven by means of an electric motor (not illustrated).

The grinding wheel 13 is fixed longitudinally of the bed 11, but is shiftable transversely of the bed 11 both for the purpose of grinding different dimensions on a workpiece W and to compensate for variations in the diameter of the grinding wheel 13. With the grinding wheel 13 in a retracted position, the workpiece W will be positioned longitudinally of the bed 11 with one of the portions thereof in alignment with the grinding wheel 13.

After the workpiece W has been properly positioned in alignment with the grinding wheel 13, the grinding wheel 13 is advanced towards the workpiece W when the grinding operation is performed. In the past, automatic feed mechanisms for the grinding wheel support 12 to effect automatically the repeated grinding of workpiece portions to a selected diameter, have been provided. The purpose of this invention is to provide a control system for controlling the actuation of a feed mechanism which advances the grinding wheel 13 relative to the workpiece W for predetermined distances and at preselected rates so that each diameter of the workpiece W will be accurately ground after an initial setting of the machine and control system.

The feed mechanism for advancing and retracting the wheel support 12 during a grinding operation includes a feed screw 14 which is slidably mounted in the bed 11. The feed screw 14 carries a piston 15 which is mounted within a cylinder 16 to effect rapid advancing and retracting movements of the feed screw 14.

The feed screw 14 is in threaded engagement with a thread engaging member 17 formed on the lower end of a vertical anchor shaft 18. The vertical anchor shaft 18 is provided with an upper flange 19 which is secured to the wheel support 12 by bolts 20. The vertical anchor shaft 18 extends through a vertical cavity 21 formed in the wheel support 12.

The feed screw 14 is connected by a shaft 23 to a gear 24. The gear 24 is meshed with a second gear 25 which has a shaft 26 connected thereto for coupling the gear 25 to an electro-hydraulic pulse motor 27.

The electro-hydraulic pulse motor 27 is energized, via wiring 29, from a drive circuitry 30. The drive circuitry 30 receives its controlling input from the control system illustrated in FIG. 2 via a wiring 31, and its power input from a 24-volt five phase power supply 28 via a wiring 39.

A rapid feed valve controller 32 is provided for selectively actuating the piston 15. The cylinder 16 is connected to the feed valve controller 32 by a pair of hydraulic fluid conduits 33. The rapid feed valve controller 32 is provided with a hydraulic fluid input conduit 34 and a hydraulic fluid output conduit 35 which are connected to a suitable pump (not illustrated) in a conventional manner. The rapid feed valve controller 32 is provided with an enable rapid feed input lead 36 on which may appear a signal to begin a grinding operation. The rapid feed valve controller 32 is also provided with an input lead 37 suitable for receiving a retract signal indicating that a grinding operation has been completed.

The grinding wheel support 12 is provided with a bracket 22 which is movable with the wheel support 12. The bed 11 is provided with a bracket 38 positioned near the bracket 22. A switch, generally indicated by the numeral 40, is carried by the bracket 38. The switch 40 is provided with an output lead 41 on which appears a start grinding feed signal whenever the bracket 22 trips the switch 40 during initial rapid feed performed by the feed piston 15.

The electro-hydraulic pulse motor 27 may, in a practical embodiment, consist of an Icon Model 1-SSS motor. This particular Icon electro-hydraulic pulse motor is designed so that it rotates one revolution for each 240 pulses applied to its input. The gearing is arranged so that each pulse applied to the pulse motor 27, in the aforementioned practical embodiment, is effective to move the grinding wheel support 12 in fine increments such as 0.000050 of an inch.

Figure 2:
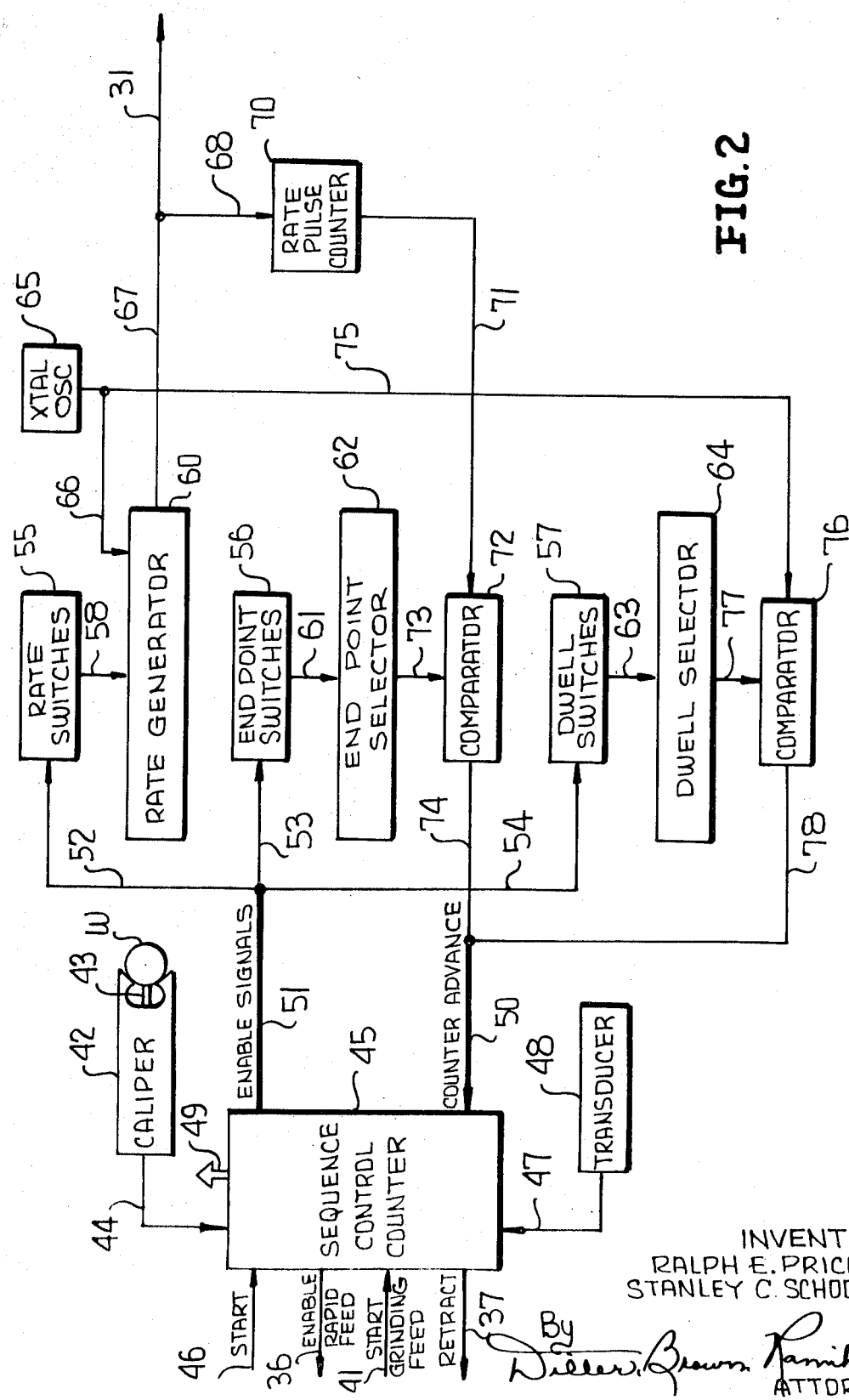
FIG. 2 is a block diagram of a control system for actuating the electro-hydraulic pulse motor and the rapid feed valve controller of FIG. 1.

Referring now in detail to FIG. 2, a control system for developing signals to be applied to the drive circuitry 30 (illustrated in FIG. 1) via the wiring 31, and enable rapid feed and retract signals for application respectively via the leads 36 and 37 to the rapid feed valve controller 32 (illustrated in FIG. 1) is shown. The control system includes a caliper 42 which is arranged to sense the diameter of the workpiece W. The caliper 42 includes a probe 43 which is connected to the core of a transducer (not illustrated). The probe 43, as illustrated, is held in engagement with the workpiece W by means of a spring (not shown) during particular portions of a cycle of operation. Details of a suitable caliper are shown in FIG. 1 of U.S. Pat. No. 3,157,971, granted November 24, 1964. The output of the caliper 42 is coupled, via a lead 44, to a sequence control counter 45.

The sequence control counter 45 is provided with a number of additional input means for supplying control signals thereto. A lead 46 is connected to the sequence control counter 45 to supply a signal from a manually operated switch (not illustrated). As another input, the lead 41 from the switch 40 (FIG. 1) is connected to the sequence control counter 45 to provide a start grinding feed signal to advance the sequence control counter 45 at the end of a rapid feed period. A lead 47 is connected to the sequence control counter 45 for coupling signals from a transducer 48 which is arranged to sense the current input to the electric motor (not illustrated) which rotates the grinding wheel 13 (FIG. 1). The transducer 48 senses the increase in current to the electric motor (not illustrated) as it rotates the grinding wheel 13 (FIG. 1) when its forward facing grinding surface first contacts the workpiece W. Additional counter advance signal data is provided from a wiring 50 as will be made clear in more detail below.

The sequence control counter 45 is provided with a number of outputs. An output is provided to the lead 36 which is connected from the sequence control counter 45 for providing an enable signal to the rapid feed valve controller 32 (FIG. 1) to initiate a rapid feed of the grinding wheel 13 (FIG. 1) towards the workpiece W before any grinding takes place. The sequence control counter 45 also provides an output signal to the lead 37 for supplying a retract signal to the rapid feed valve controller 32 upon the completion of a cycle of operation.

As an input to the control arrangement, the sequence control counter 45 is provided with a wiring 51 on which enable signals from the sequence control counter appear. It will be readily understood that still further outputs from the sequence control counter 45 may be provided by additional wiring indicated generally by the arrowhead 49.

The wiring 51 supplies enable signals to wirings 52, 53 and 54 which are connected respectively to rate switches 55, end point switches 56 and dwell switches 57.

The rate switches 55 are coupled via a wiring 58 to a rate generator 60 which produces pulses of predetermined repetition rates.

The end point switches 56 are connected via a wiring 61 to an end point selector 62 which produces signals indicating the desired advance distances of the grinding wheel 13 (FIG. 1) during a sequence of operation.

The dwell switches 57 are connected by a wiring 63 to a dwell selector 64 which produces signals indicative of desired dwell times to be established during a sequence of operation.

The rate generator 60, in addition to the enable signals applied thereto via the rate switches 55 and the wiring 58, is provided with an input from a crystal controlled oscillator 65 via a lead 66. Since the rate generator 60 is controlled by the crystal oscillator 65, it will be appreciated that the output of the rate generator is very stable and accurate. The output from the rate generator 60 appears on a wiring 67 and may be a pulse train of various repetition rates, depending on the condition of the rate switches 55 and the enable signals appearing on the wiring 51. It will be appreciated that the rate signals which appear on the wiring 67 may be encoded if desired. The wiring 67 branches into the wiring 31 which supplies control signals to the drive circuitry 30 (FIG. 1) which serves to advance the electro-hydraulic pulse motor 27 (FIG. 1).

The wiring 67 additionally branches into a wiring 68 thereby coupling the output from the rate generator 60 to a rate pulse counter 70. The rate pulse counter 70, in turn, is coupled via a wiring 71 to a first input of a comparator 72. The comparator 72 is provided with a second input via a wiring 73 which is coupled to the end point selector 62. The comparator 72 is arranged to provide an output on a wiring 74 whenever the signals appearing on the wirings 73 and 71 indicate that a sufficient number of pulses have been produced to advance the grinding wheel 13 (FIG. 1) to a given point with respect to the workpiece W as determined by the end point selector 62 and the setting of the end point switches 56. The output wiring 74 from the comparator 72, is a tributary wiring for the wiring 50. Thus, it will be appreciated that counter advance signals may appear on the wiring 74 which advance the sequence control counter 45.

An output from the crystal oscillator 65 appears on a wiring 75 thereby providing a first input to a second comparator 76. The comparator 76 is provided with a second input via a wiring 77 from the dwell selector 64. The comparator 76 is operatively arranged to produce a counter advance signal on its output wiring 78 whenever the number of pulses from the crystal oscillator are such to indicate that a particular dwell period determined by the dwell switches 57 and the dwell selector 64 has elapsed during a part of a desired cycle of operation.

Figure 3B:
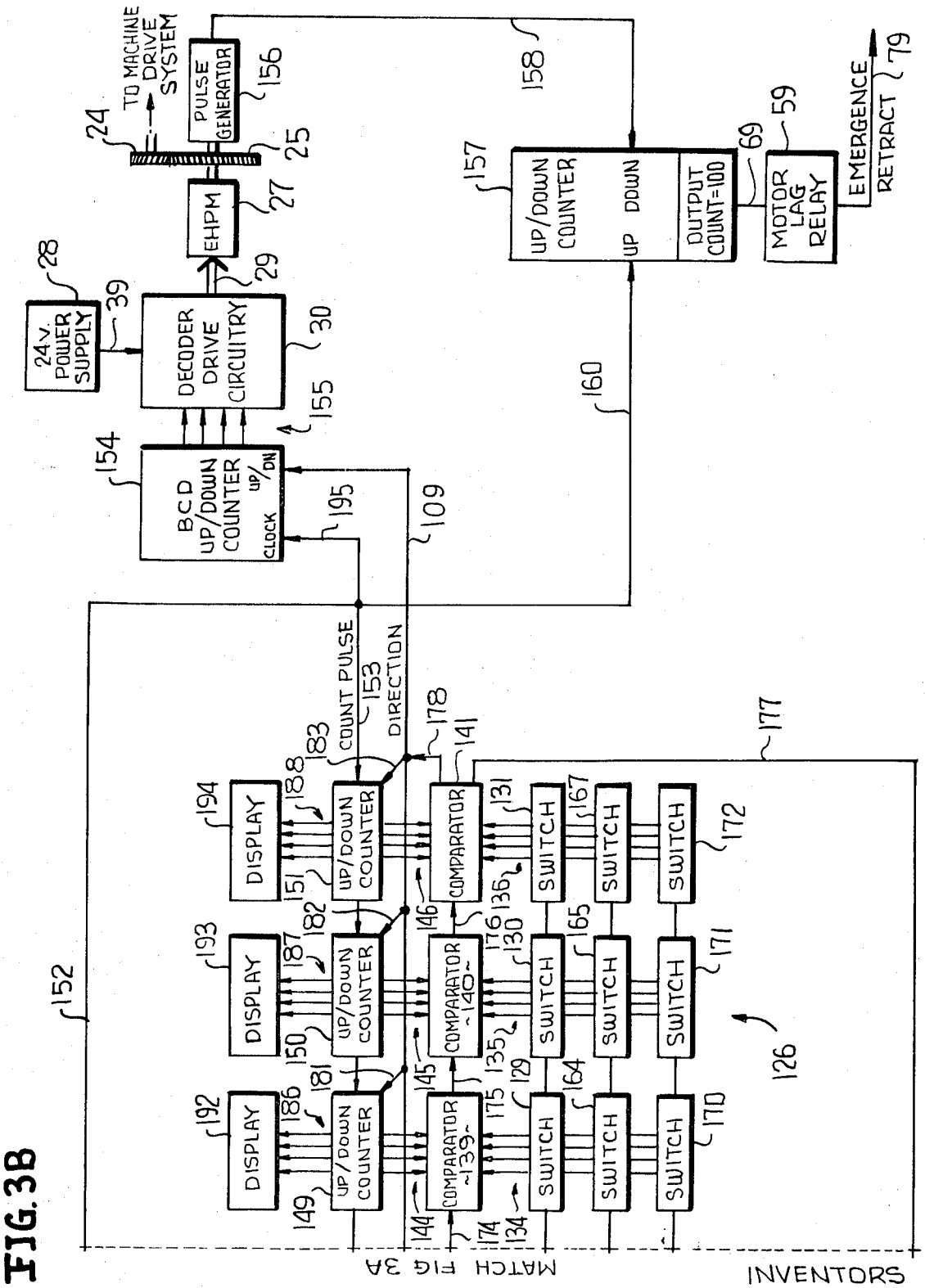

Referring now in detail to FIG. 3A and FIG 3B, a control arrangement for moving a machine tool element, such as the grinding wheel support 12 (FIG. 1) by suitably energizing an electro-hydraulic pulse motor 27 which includes binary coded decimal circuitry in accordance with an illustrative preferred embodiment incorporating the present invention is seen.

The control arrangement like that illustrated in FIG. 2, includes a sequence control counter 45 which is provided with a number of input signal receiving means. The input signal receiving means include a lead 46 on which may appear a start signal, a lead 41 on which may appear a start grinding feed signal, a lead 47 on which may appear a signal from a transducer 48 which is arranged to sense an increase in current supplied to an electric motor (not illustrated) which rotates a grinding wheel, such as grinding wheel 13 illustrated in FIG. 1. The current increases, due to increased load, when the principal grinding surface of a grinding wheel contacts a major surface of a workpiece W. Signals for advancing the sequence control counter 45 are also provided from a wiring 177 and a wiring 78 from other portions of the control arrangement as will be more clearly discussed below. Additionally, the sequence control counter 45 is provided with an input from a caliper 42. The caliper 42 includes a probe 43 which contacts the workpiece W during portions of a cycle of operation.

As illustrated, the output of the caliper 42 is coupled via a lead 80 to an encoder 81 which provides a signal to the sequence control counter 45 via a wiring 82 which indicates the instant size of the workpiece W as sensed by the probe 43 during a portion of a cycle of operation.

The sequence control counter circuitry is internally constructed of counters and suitable logic circuitry to provide a number of output signals in accordance with a program. The sequence control counter 45 is provided with an output lead 36 on which may appear an enable rapid feed signal, an output lead 37 on which may appear a retract signal and a wiring 83 on which may appear range selecting signals which are applied to a range selector 84 which, with a binary rate multiplier 86, form a rate generator 60.

The range selector 84 is coupled, via a lead 66 to the output from a 400 KC crystal oscillator 65.

The output of the range selector 84, depending on the signal provided from the wiring 83, appears on a lead 85 as a train of pulses having one or another of different repetition rates illustrated as 400 KC or 40 KC or 4 KC. The lead 85 is connected to a first input of the binary rate multiplier 86 which receives, as its other input, binary coded decimal signals from rate switches indicated generally by the numeral 87.

The sequence control counter 45 is provided with five output leads 90–94 on which appear selective enable signals for application to the rate switches 87 for establishing various feed rates during a cycle of operation.

The sequence control counter 45 is also provided with three output leads 95, 96 and 97 which are connected as three separate inputs to an OR circuit 98. The OR circuit 98 is provided with an output lead 100 which is coupled to a first input of an AND circuit 101. The AND circuit 101 is provided with a second input from a lead 102 supplied from the range selector 84 and illustrated as being a pulse train having a 1 KC repetition rate. The output of the AND circuit 101 appears on a lead 102 thereby providing a first input to a comparator 76. A second input to the comparator 76 is provided from a wiring 77 which, in turn, is coupled to receive the outputs from a dwell selector 64. Similarly to the embodiment illustrated in FIG. 2, the selector 64 is arranged to receive signals from dwell switches 57 via a wiring 63. The dwell switches 57, as illustrated, are supplied with three inputs from the sequence control counter 45 by means of three leads 103, 104 and 105 on which may appear individual dwell enable signals.

The binary rate multiplier 86 is coupled to the rate switches 87 by means of two wirings indicated generally by the numerals 106 and 107 each of which consists of four leads. Binary coded decimal signals may appear on the wirings 106 and 107 in accordance with the instant condition of the sequence control counter 45, the particular enable signals which appear on the output leads 90–94 from the sequence control counter 45 and the condition of the rate switches 87 which may be set in accordance with the wishes of an operator. Sidewall feed enable signals which may appear on the lead 90 from the sequence control counter 45 are coupled by wiring 108 to rate switches 110 and 111 which may be adjusted, as will be readily understandable by those skilled in the art, to provide for binary coded decimal signals to appear on the wirings 106 and 107 in accordance with the settings of the rate switches 110 and 111, respectively. The rate switches 110 and 111 are operatively arranged to place selected ones of the four leads which comprise the wiring 106 and selected ones of the four leads which comprise the wiring 107 in either a high (1) signal condition or a low (0) signal condition by simply passing selectively the sidewall feed enable signal which may appear on the lead 90 to predetermined ones of the leads composing the wirings 106 and 107.

The leads 91 and 92 from the sequence control counter 45, on which signals may appear during a cycle of operation, provide rapids advance enable and No. 1 feed enable signals which are coupled respectively via wirings 112 and 115 to rate switches 113 and 114, and rate switches 116 and 117. The leads 93 and 94 from the sequence control counter 45 are connected respectively to rate switches 118 and 120, and rate switches 121 and 122 for applying thereto No. 2 feed enable and fine feed signals, respectively.

A more detailed illustration of a range selector, binary rate multiplier and rate switching arrangement in combination with a sequence control counter suitable for practicing the present invention is described in detail hereinafter in conjunction with FIG. 5 of the accompanying drawings.

Returning now to FIGS. 3A and 3B, it will be seen that the leads 90, 91 and 92 are connected respectively by wirings 123, 124 and 125 to selected switches of a bank of end point selecting switches indicated generally by the numeral 126.

The wiring 123 is arranged to supply to end point switches 127–131 sidewall feed enable signals. The end point switches 127–131, similarly to the rate switches 110 and 111, may be set by an operator to supply respectively binary coded decimal signals to the wirings indicated generally by the numerals 132–136. As illustrated, the wiring 132 consists of four leads on which may appear signals indicating a high (1) condition by passing the sidewall feed enable signal which appears on the wiring 123 to selected ones of the four leads which compose the wiring 132 depending on the condition of the individual contacts within the switch 127. Similarly, sidewall feed enable signals may be passed to selected ones of the leads which composed the wirings 133–136 depending on the particular settings of individual contacts within the switches 128–131, respectively. Thus, binary coded decimal signals may appear on the wirings 132–136 whenever the sequence control counter 45 signals the beginning of a sidewall feed via lead 90 and wiring 123.

The wirings 132–136 are respectively connected to binary comparators 137–141 for the purpose of comparing binary coded decimal signals supplied respectively via wirings 142–146 from up/down counters 147–151, respectively. The up/down counters 147–151 are arranged to receive, via wirings 152 and 153, a count output from the binary rate multiplier 86. Thus, the comparators 137–141 are operatively arranged to compare binary coded decimal signals from the end point switches 126 which indicate a desired position for the advancing grinding wheel (FIG. 1) and a number of effective pulses which are supplied from the binary rate multiplier as a binary coded decimal number indicative of the instant position of the grinding wheel 13 (FIG. 1) as it is being advanced during a sidewall feed enable portion of a grinding cycle. This is so because an output from the binary rate multiplier 86 is supplied to a binary coded decimal up/down counter 154 which, in turn is coupled via wiring generally indicated by the numeral 155 to drive circuitry 30 which is supplied with five-phase 24 -volt power supply 28, via a wiring 39. The drive circuitry 30 supplies power, under the control of the binary coded decimal up/down counter 154, to an electro-hydraulic pulse motor 27 via a wiring 29.

The electro-hydraulic pulse motor 27 is coupled to a machine drive system via gears 25 and 24. The gear 25, which is directly coupled to the electro-hydraulic pulse motor 27, is arranged to drive a pulse generator 156 which supplies pulses to an up/down counter 157 via a lead 158. The lead 158 is connected to the down input terminal of the up/down counter 157. The up input terminal of the up/down counter 157 is connected, via a lead 160 to the wiring 152.

The pulse generator 156 generates pulses corresponding to the effective pulses supplied from the binary rate multiplier 86 so that during proper operation the up/down counter 157 will receive as many up-determining pulses as it receives down-determining pulses, and the output from the counter 157 ideally would be zero. The up/down counter 157 is arranged to provide an output on a lead 69 whenever the count difference between the up and down pulses supplied thereto equals 100 indicating that the electro-hydraulic pulse motor 27 is not advancing in accordance with the signals which are applied to the binary coded decimal up/down counter 154. The output which may appear on the lead 69 activates a motor lag relay 59 which, in turn, provides an emergency retract signal on a lead 79.

Leads 91 and 92 on which may appear respectively fast approach signals and No. 1 feed enable signals from the sequence control counter 45 are coupled respectively to wirings 124 and 125.

The wiring 124 is connected to the end point switches 162 through 167 which, in turn, are coupled respectively to the wirings 132-136. As can readily be appreciated from the foregoing discussion relating to end point switches 127-131, the end point switches 162-167 may be similarly set by an operator so that selected contacts within each of the switches 162-167 are effective to supply high (1) or low (0) signals to individual leads in the wirings 132-136 so as to supply the comparators 137-141 with binary coded decimal signals upon the occurrence of a fast approach enable signal on the wiring 124 from the lead 91.

The wiring 125 is arranged to couple the No. 1 feed rate signals which may appear on the lead 92 to yet another set of end point switches designated by the numerals 168-172 which, like the other end point switches, may be set by an operator to supply binary coded decimal signals on the wirings 132-136 upon the occurrence of an enable signal from the sequence control counter supplied over the lead 92 and the wiring 125.

In operation, the binary comparator 137 operates to compare a particular binary coded decimal signal supplied from contacts within either end point switches 127, 162 or 168 depending on which, if any, of the enable signals appear on the wirings 123, 124 and 125, respectively, with a binary coded decimal signal from a wiring 142 which indicates the instant positioning of a grinding wheel, such as grinding wheel 13 illustrated in FIG. 1, as determined by the number of effective pulse signals supplied from the wiring 152. Each of the comparators 137-141 is coupled respectively to the next succeeding comparator via leads 173-176. As each comparator detects a match between the binary coded decimal signals applied thereto, an enable signal appears on its respective output leads 173-176 which places the next succeeding comparator into operation. As will be appreciated by those skilled in the art, each comparator is concerned with one of the significant digits, the last comparator 141 being concerned with the last-significant digit.

The comparator 141 is provided with an output wiring 177 on which appears a signal for advancing the sequence control counter 45 whenever the final comparator 141 signals a match between the two binary coded decimal numerals applied thereto.

The comparator 141 is coupled via a wiring 178 and a wiring 109 to the up/down input of the binary coded decimal up/down counter 154 in order to halt the driving of the electro-hydraulic pulse motor 27. The output from the final comparator 141 is similarly coupled respectively to the up/down counters 147-151 via the leads 179-183.

A more detailed description of a comparator system which includes five comparators for comparing binary coded decimal signals and which may be used in the system illustrated in FIGS. 3A and 3B is described hereinafter with reference to FIG. 4 of the accompanying drawings.

Each of the up/down counters 147-151 is provided with a second output wiring designated respectively by the numerals 184-188. Each of the wirings 184-188 supply respectively binary coded decimal signals to one of respective display members 190-194 which preferably provide a visual indication of decimal numerals indicative of the instant diameter of the workpiece W as it is undergoing grinding.

The sequence control counter 45 may be provided with additional output connections indicated generally by the arrowhead 49. The additional output connections 49 may be used to control other instrumentalities, such as relays 196. The relays 196 may be arranged to energize indicators (not illustrated), to energize means for moving the probe 43 into contact with the workpiece W during selected periods, and/or to energize means for bringing steady rests (not illustrated) into position at suitable times during an operation cycle.

Turning now to FIG. 4, a detailed comparator arrangement suitable for developing respectively counter advance signals and direction signals on wirings 177 and 178 is seen. The arrangement is suitable for use in the machine tool and control arrangement illustrated in FIGS. 3A and 3B.

The control arrangement provides binary signal data indicative of the instant diameter of a workpiece W (FIG. 3A) determined by the effective number of pulses provided from the binary rate multiplier 86 to drive the electro-hydraulic pulse motor 27 (FIG. 3B) via the counter 154 (FIG. 3B) and the drive circuitry 30 (FIG. 3B).

Binary signal data from the output of the binary rate multiplier 86 is fed, via a wiring 202 to a plurality of up/down counters 270-274 each of which is provided respectively with an output wiring 275-279. Each of the comparators 197-201 is arranged to receive binary data indicative of a single digit representative of the instant dimension of the diameter of workpiece W as determined by the output, from the up/down counters 274, 273, 272, 271 and 270, respectively.

Binary signal data representative of a desired dimension for the diameter of the workpiece W, during a portion of the operation cycle, is obtained from end point switches 126. The output from the end point switches 126 is coupled, via a wiring 203, to the comparators 197-201 as binary data representative of a desired dimension for the diameter of the workpiece W.

Each of the comparators 197-200 is of similar construction to the comparator 201.

The comparator 201 includes an adder 204 having one input connected to the wiring 275 for receiving binary signals representative of the last significant digit of the instant diameter of the workpiece W as determined by the output from the up/down counter 270. A second input to the adder 204 is provided from a bit by bit complement circuit (inverter) 205 which has its input coupled to receive, during a cycle of operation, binary signal data from the wiring 203 representative of the last significant digit of a desired dimension for the diameter of the workpiece W as predetermined by the end point switches 126. Four sum outputs from the adder 204 are coupled as individual inputs to a five-input AND circuit 206. The carry output from the adder 204 is coupled to one input of a two-input AND circuit 207. The fifth input to the AND circuit 206 is provided from the output of a five-input AND circuit 208 associated with an adder 209 forming part of the next preceding comparator 200. A second input for the AND circuit 207 is similarly connected to the output of the AND circuit 208 associated with an adder 209 forming part of the comparator 200. The output from the AND circuit 206 is connected to the wiring 177 on which may appear a counter advance signal. The output from the AND circuit 207 is connected to the wiring 178 on which may appear a direction signal.

As illustrated, the comparator 200 is constructed in the same manner as the comparator 201 and includes a two-input AND circuit 210 which receives as one of its input a carry output from the adder 209 forming part of the comparator 200. The output from the tow-input AND circuit 210 is connected to a terminal 211. Terminals 212 and 213, associated respectively with comparators 199 and 198, are similarly connected to corresponding AND circuits (not illustrated) forming part of the comparators 199 and 198. A terminal 214 is connected directly to the carry output from an adder (not illustrated) forming part of the comparator 197 which, unlike the comparators 198–201, does not utilize a two-input AND circuit for processing the carry output from its adder (not illustrated). The terminals 211–214 provide signals indicating the condition of the respective comparators 201, 200, 199, 198 and 197 and may be utilized, for example, to energize indicator lights (not shown) or the like.

Figure 5:
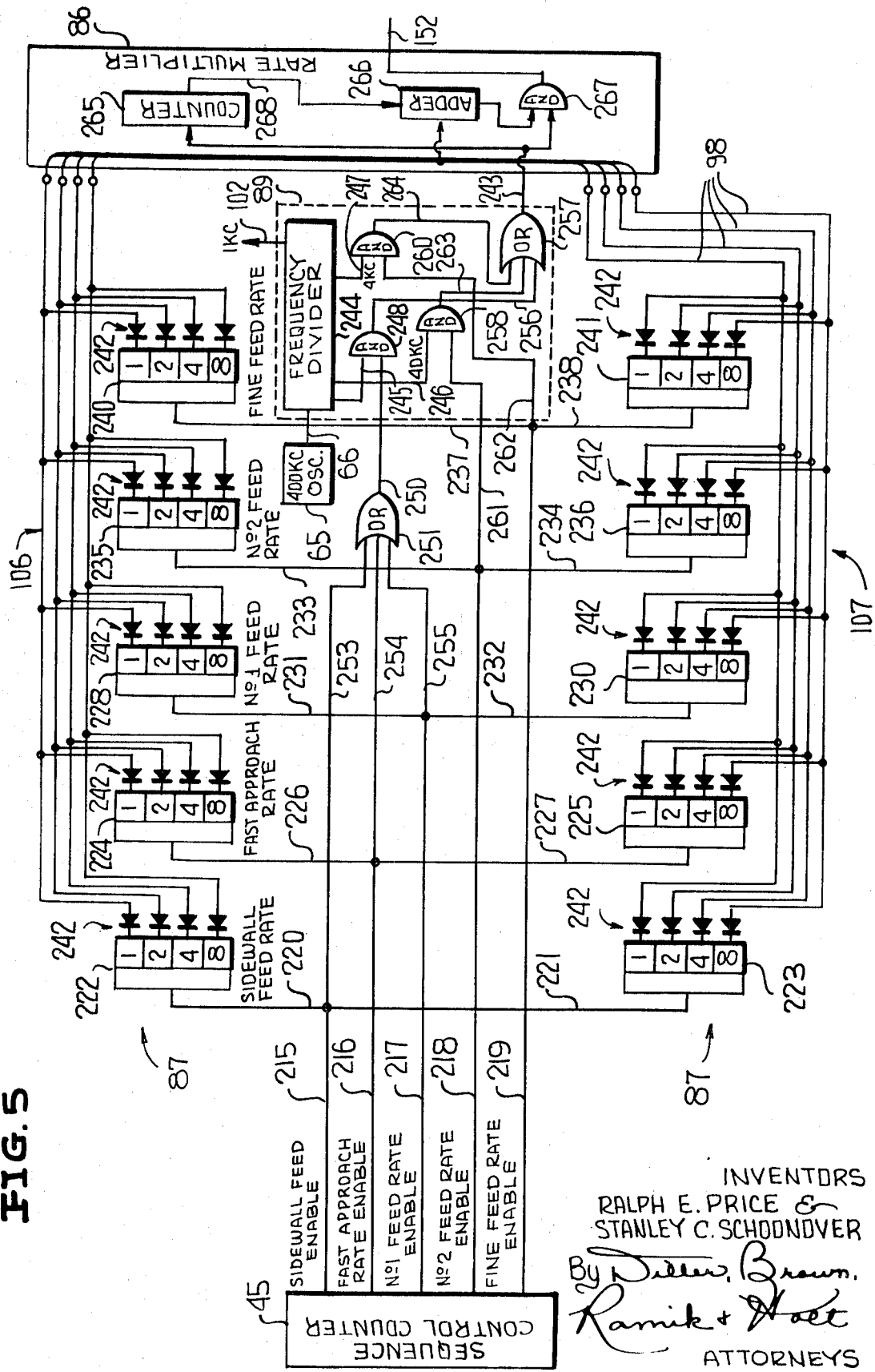
FIG. 5 is a block diagram of a rate selecting system which may be utilized in the control system illustrated in FIGS. 3A and 3B.

Turning to FIG. 5, a block diagram of a rate selecting system which may be used in the control system for driving an electro-hydraulic pulse motor, such as the pulse motor 27, illustrated in FIG. 1 and FIG. 3B, is shown.

A sequence control counter 45 is provided with five output leads identified by the numerals 215–219. The sequence control counter 45 is programmed and designed to supply a number of enable signals, which appear individually on the output leads 215 through 219, to rate selecting switches generally indicated by the numerals 87. It will be readily understood by those skilled in the art, that the sequence control counter 45 is arranged to provide an enable signal on any one of the leads 215–219 at any one time, and that in a practical embodiment dwell periods also may be provided during which no enable signals appear on any of the leads 215–219.

The lead 215 is respectively connected via a lead 220 and a lead 221 to sidewall feed rate selecting switches 222 and 223 for passing a sidewall feed enable signal to the sidewall feed rate switches 222 and 223. In a similar fashion, fast approach rate selecting switches 224 and 225 have their inputs connected respectively via a lead 226 and a lead 227 to the lead 216 for receiving a fast approach rate enable signal from the control counter 45. Similarly, No. 1 feed rate selecting switches 228 and 230 are connected respectively via leads 231 and 232 to the lead 217 on which appears a No. 1 feed rate enable signal. A lead 233 and a lead 234 are connected to the lead 218 for receiving a No. 2 feed rate enable signal from control counter 45 and couple respectively an enable signal to No. 2 feed rate selecting switches 235 and 236. In a similar fashion, a lead 237 and a lead 238 are connected to the lead 219 for coupling a fine feed rate enable signal to fine feed rate selecting switches 240 and 241, respectively.

In a practical embodiment, the sidewall feed rate selecting switches 222 and 223 comprise numbered thumbwheel switches arranged to be manually set by a machine operator. It will be appreciated by those skilled in the art that the thumbwheel switches are designed so that the rate selector switches 222 and 223 provide binary coded decimal signals corresponding to the decimal numbers 0 to 99 depending on the desire of an operator who may manually adjust a thumbwheel (not illustrated) forming part of the sidewall feed rate selecting switch 222 to provide a possible high (1) signal condition or a possible low (0) signal condition as individual outputs appearing on four output leads from the switch 222 upon the occurrence of a sidewall feed enable signal from the control counter 45. In a practical embodiment, the high (1) signal condition is provided by simply passing the sidewall feed enable signal to selected ones of the four output leads from the switch 222. The low (0) signal condition is established by simply connecting selected ones of the output leads of the switch 222 to a point of reference potential (not illustrated). As will be clear to those skilled in the art, the individual outputs from the switch 222 represent bits from the least-significant bit to the most-significant bit of a binary coded decimal number. Similarly, a thumbwheel (not illustrated) forming part of the sidewall feed rate selecting switch 223 may be manually adjusted to provide an additional four bit binary coded decimal signal. Since the same enable signal is applied to both of the switches 222 and 223 at the same time, the two switches may provide selectable binary coded decimal signals corresponding to the decimal numbers 0 to 99.

The fast approach rate selecting switches 224 and 225, and the No. 1 feed rate selecting switches 228 and 230 include thumbwheels (not illustrated) and are otherwise constructed similarly to the feed rate switches 222 and 223. Likewise, each of the No. 2 feed rate switches 235 and 236, and each of the fine feed rate switches 240 and 241 also include a thumbwheel (not illustrated).

Each of the rate selecting switches has each of its four outputs coupled to a wiring 106 or a wiring 107 via an isolating diode, the isolating diodes being illustrated generally by the numeral 242. Each of the isolating diodes 242 effectively buffer an output from one feed rate switch from the outputs of other feed rate switches so that contacts within the feed rate switches may individually be able to provide low (0) outputs on selected output leads without grounding out or undesirably establishing false low signal conditions for corresponding significant bits from other feed rate switches. The wiring 106 and the wiring 107 are connected to a binary rate multiplier 86, and serve to couple binary coded decimal signals from the feed rate switches, as they are enabled to the binary rate multiplier 86.

In addition to the binary coded decimal inputs available from the wirings 106 and 107, the binary rate multiplier 86 is provided with a second input from a lead 243. As will hereinafter appear, a train of pulses of various predetermined repetition rates may appear on the lead 243.

A 400 KC crystal-control oscillator 65 is arranged to supply, via a lead 66, an input to a range selector 84. The range selector 84 includes a pulse-producing frequency divider 244 which, as illustrated, has three output leads 245, 246 and 247 on which appears pulse trains having respectively a 400 KC repetition rate, a 40 KC repetition rate and a 4 KC repetition rate. The lead 245 supplies the pulse train having a 400 KC repetition rate as a first input to an AND circuit 248 which has a second input thereof connected by a lead 250 to an output of an OR circuit 251. The OR circuit 251 is provided with three input leads 253, 254 and 255 which are connected respectively to the leads 215, 216 and 217 on which may appear enable signals from the control counter 45. An output from the AND circuit 248 is connected, via a lead 256, to a first input of an OR circuit 257.

The leads 246 and 247 are connected respectively to first inputs of an AND circuit 258 and an AND circuit 260 for supplying pulse trains having respectively a repetition rate of 40 KC and 4 KC as first input signals to the respective AND circuits 258 and 260. Each of the AND circuits 258 and 260 is provided respectively with second input signals via leads 261 and 262. The lead 261 is connected to the lead 218 on which may appear No. 2 feed rate enable signals, and the lead 262 is connected to the lead 219 on which may appear fine feed rate enable signals.

An output from each of the AND circuits 258 and 260 is connected via respective leads 263 and 264 as a second input and a third input to the OR circuit 257. An output from the OR circuit 257 appears on the lead 243 which supplies a selected pulse train input to the binary rate multiplier 86. It will be evident to those skilled in the art that one or another of the outputs from the pulse-producing frequency divider 244 will appear on the lead 243 depending on which feed rate enable signal is being supplied from the control counter 45 to the OR circuits 251 and 257, and the AND circuits 248, 258 and 260. The output wiring 152 is connected to binary rate multiplier 86 for receiving an output signal therefrom.

The binary rate multiplier 86 includes a hundred's counter 265, an adder 266, and an AND circuit 267. The pulse train of predetermined repetition rate, which may appear on the input lead 243 of the binary rate multiplier 86, supplies a selected pulse train as an input to the counter 265 and as a first input to the AND circuit 267. An output from the counter 265 is connected, via a lead 268, as a first input to the adder 266 which receives binary coded decimal signals from the wirings 106 and 107 as its second input. The adder 266 has its output coupled as a second input to the AND circuit 267. The wiring 152 is connected to an output of the AND circuit 267.

The wiring 152, in a practical embodiment, may be connected to a clock input of a binary coded decimal up/down counter such as counter 154 shown in FIG. 3B, for supplying an output signal from the binary rate multiplier 86 thereto. The binary coded decimal counter 154 (FIG. 3B), in turn, may have its output connected to the input of a drive circuit, such as drive circuitry 30 (FIG. 3B) so as to drive the electrohydraulic pulse motor 27 (FIG. 3B).

OPERATION

Before considering the operation of the control system illustrated in FIG. 2 in conjunction with the feed mechanism shown in FIG. 1, the operation of the comparator arrangement illustrated in FIG. 4 and the rate selecting system shown in FIG. 5 will be briefly described.

Referring now to the arrangement illustrated in FIG. 4, and for purposes of illustration, let it be assumed that the instant diameter of the workpiece W as determined by the outputs from the up/down counters 270-274, which have responded to the output from the binary rate multiplier 86, corresponds very closely to the desired dimension of the workpiece W for a portion of a cycle of operation, and all digits except the last significant digit of a binary coded decimal signal indicative of the instant diameter are correct as a result of previous feed movements. In these circumstances, a binary signal, which is representative of the last significant digit of the diameter of the workpiece W, appears on the wiring 275 from the up/down counter 270. The binary signal is coupled to a first input of the adder 204, forming part of the comparator 201, by the wiring 275. A second input to the adder 204 is provided from the bit by bit complement circuit 205 which, in turn, receives a binary signal from the wiring 203 representative of the last significant digit of the desired diameter for the workpiece W as determined by the end point switches 126.

The adder 204 operates to add the binary signal representing the last significant digit which it receives via wiring 275 to the signal from the bit by bit complement circuit 205 which receives the binary signal representing the last significant digit of the desired dimension of the workpiece W as determined by the end point switches 126. Since one binary number is less than another, if the first number plus the bit by bit complement of the second number results in a carry, a carry output appears from the adder 204 so long as the binary number provided from the wiring 202 is greater than the binary number provided from the wiring 203. The carry output from the adder 204 is coupled via the AND circuit 207 to the direction wiring 178 thereby providing a signal thereon indicating the need for further grinding.

Since two binary numbers are equal if a first number plus the bit by bit complement of a second number results in all ones, the adder 204 functions to provide, at its four sum outputs, signals representing logical one conditions whenever the binary number are equal. These signals are fed as four inputs to the AND circuit 206. An additional input of the AND circuit 206 is also provided with a one condition as a result of the match of a previous digit as will be more fully explained below. The output from the AND circuit 206 which appears when all five of its inputs are in a logical one condition, is connected as a counter advance signal for the purpose of advancing a control counter, such as the control counter 45 illustrated in FIG. 3A.

The appearance of a control signal on the wiring 178 indicates that a portion of the grinding cycle of operation is complete.

It will be appreciated, in most applications, that the desired dimension of a workpiece W as a result of a rapid feed movement and a grinding feed movement may not be sufficiently close to the desired dimension of the workpiece, during a portion of a cycle of operation, so that only the last significant digit differs. Thus, it is desirable to provide means for matching other significant digits in addition to the last significant digit.

Turning again to FIG. 4, it is to be noted that the control system as illustrated therein is arranged to respond to five significant digits. Let it be assumed that upon the end of a part of an operational sequence the instant diameter of the workpiece W as determined by the outputs from the up/down counters 270–274, which are responsive to the output from the binary rate multiplier 86, has not yet resulted in any of the comparators 197–201 signaling a match. Binary signals, from up/down counters 270–274, appear on the wirings 275–279 indicating the instant diameter of the workpiece W, and binary signals indicating the desired diameter of the workpiece W appear on the wiring 203 from the end point switches 126.

Binary signal data, representing the first significant digit of the five digits involved, appears on wiring 279 and is compared in the comparator 197 with binary data appearing on wiring 203 which represents the desired first significant digit. When the two inputs to the comparator 197 become equal, the comparator 197 provides an output signal indicating a match which is fed to the next succeeding comparator 198 as one of the inputs to an AND circuit (not illustrated) which corresponds to the AND circuit 206 forming part of the comparator 201. Each of the comparators 198 through 200 sequentially operate, in response to signals from wirings 278, 277 and 276, respectively, and inputs from wiring 203, to determine a match on succeeding lesser significant digits until, the first four significant digits are matched establishing a match signal on the output from the comparator 200 which is fed as one of the input signals to the AND circuits 206 and 207.

As can be seen from the brief foregoing discussion of the control system operation and AND circuit 207 supplies a direction signal to the wiring 178 as a signal calling for additional movement of a grinding wheel support such as the grinding wheel support 12 shown in FIG. 1. Upon the occurrence of a match of the last significant digit, the carry signal from the adder 204 becomes a logical zero (0) signal, and the AND circuit 206 no longer provides an output calling for further advance of a grinding wheel support, such as the grinding wheel support 12 shown in FIG. 1. The output from the AND circuit 206 goes high, that is, to a one (1) condition thereby providing a signal for advancing a control counter, such as the control counter 45 illustrated in FIG. 3A.

To place the rate control system illustrated in FIG. 5 in operation, the thumbwheels (not illustrated) associated with the feed rate switches 222 through 225, 228, 230, 235, 236, 240 and 241 are set so as to be able to provide predetermined binary coded decimal signals in accordance with the desire of the operator, and power is supplied to the system from a power supply arrangement (not illustrated).

With the application of suitable power, the oscillator 65 begins to oscillate at 400 KC supplying an input to the pulse producing frequency divider 244. A 400 KC pulse train appears on the lead 245, a 40 KC pulse train appears on the lead 246, and a 4 KC pulse train appears on the lead 247. Each of the pulse trains appears respectively as an input to the AND circuits 248, 258 and 260. Since signals on the leads 250, 261 and 262 are, as yet, in a low (0) condition, the AND circuits 248, 258 and 260 do not pass the aforementioned pulse trains to their respective output leads 256, 263 and 264.

The sequence control counter 45 provides a sidewall feed enable signal on the lead 215. The signal on lead 215 is coupled respectively, via the leads 220 and 221 to the sidewall feed rate switches 222 and 223, and is effectively passed, via individual contact members (not illustrated) within the sidewall feed rate switches 222 and 223, output leads 106, 107 and isolating diodes 242 to the wiring 106 and the wiring 107 as high (1) condition signals in accordance with the setting previously made by an operator of the individual contact members (not illustrated) within the sidewall feed rate enable switches 222 and 223 with the thumbwheels (not illustrated). Thus, binary coded decimal signals appear on the wirings 106 and 107 in accordance with the predetermined setting of the thumbwheels (not illustrated) associated with the sidewall feed rate switches 222 and 223. The predetermined binary coded decimal signals are coupled to the binary rate multiplier 86 and appear as a first input to the adder 266. Concurrently with the appearance of enable signals on the leads 220 and 221, an enable signal appears on lead 253, and is passed through the OR circuit 251 appearing as an output on the lead 250 thereby enabling the AND circuit 248. When the AND circuit 248 is enabled by the appearance of a high (1) output signal from the OR circuit 251 on the lead 250, the 400 KC pulse train appearing on the lead 245 is passed via the lead 256 as an input to the OR circuit 257 which, in turn, passes the 400 KC pulse train as an input to the binary rate multiplier 86 via the lead 243. Within the binary rate multiplier 86, the 400 KC pulse train is coupled to an input of the AND circuit 267 and to the input of the counter 265.

An output from the counter 265 is coupled with lead 268 as a second input to the adder 266, which receives as well the binary coded decimal signals from the wirings 106 and 107. The carry output from the adder 266 appears as an input to the AND circuit 267. An output appears on the wiring 152 from the AND circuit 267 which is directly proportional to the binary coded decimal input and the 400 KC pulse input. The adder 266 is effectively used as a comparator to provide a pulse frequency which will affect the speed of a pulse motor.

The output on the wiring 152 from the AND circuit 267 is suitable for providing a clock input to a binary coded decimal up/down counter, such as counter 154 shown in FIG. 3B which, in turn, has its output coupled to the drive circuit 30 (FIG. 3B) which controls the application of pulsed multi-phase power from the power supply 28 (FIG. 3B) to the electro-hydraulic pulse motor 27 (FIG. 3B) which, via gears 24 and 25 may move a machine element such as a grinding wheel support 12.

As can be seen from the foregoing a machine element such as a grinding wheel support 12 may be advanced at a selected given rate using the signal from the wiring 152, depending on the setting of the rate switches 222 and 223 as well as the frequency selected for the oscillator 65, until later the sidewall feed enable signal disappears from the lead 215.

When the sidewall feed enable signal appearing on the lead 215 disappears thereby removing the binary coded decimal signals, provided by the switches 222 and 223, from the wirings 106 and 107 and contemporaneously causing a low (0) signal condition to exist on the lead 253, the AND circuit 248 is disabled resulting in the disappearance of the 400 KC pulse train from the lead 243. Accordingly, both the binary coded decimal input signal and the pulse train signal previously supplied to the binary rate multiplier 86 are no longer supplied and the output on the wiring 152 from the binary rate multiplier 86 disappears. Thus, a binary coded decimal up/down counter, such as counter 154 (FIG. 3B) no longer is provided with a clock input, and the electro-hydraulic pulse motor, such as pulse motor 27 (FIG. 3B), may become stationary.

In accordance with a desired program of operation, the control counter 45 provides a fast approach rate enable signal on the lead 216 which, in turn, is coupled respectively to the fast approach rate switches 224 and 225 via the leads 226 and 227 resulting in the appearance on the wirings 106 and 107 of binary coded decimal signals predetermined by the setting of the thumbwheels (not illustrated) associated with the rate switches 224 and 225. The fast approach rate enable signal is also coupled, via the lead 254, to an input of the OR circuit 251 thereby enabling the AND circuit 248 via lead 256 providing for the passage of the 400 KC pulse train appearing on the lead 245 to the lead 243 via the lead 256 and the OR circuit 257 establishing again a 400 KC pulse train as an input to the binary rate multiplier 86 which also receives binary coded decimal signals via the wirings 106 and 107 from the rate switches 224 and 225, respectively. An output from the binary rate multiplier 86 again appears on the wiring 152. As before, the signal on wiring 152 may be applied to a binary coded decimal up/down counter such as counter 154 (FIG. 3B) to again provide an output to a drive circuit such as drive circuit 30 (FIG. 3B) until the fast approach rate enable signal disappears from the lead 216 by action of the sequence counter 45 in accordance with a program. On the disappearance of the fast approach rate enable signal from the lead 216 or, if desired, after a predetermined time elapse, the control counter 45, in accordance with a program, establishes a No. 1 feed rate enable signal on the lead 217. The signal which appears on the lead 217 is coupled respectively via the leads 231 and 232 to the rate switches 228 and 230 thereby establishing on the wirings 106 and 107 binary coded decimal signals predetermined by the setting of the thumbwheels (not illustrated) associated with the feed rate switches 228 and 230. The No. 1 feed rate enable signal appearing on the lead 217 is also coupled via the lead 255 to the OR circuit 251 thereby establishing on the lead 243 the 400 KC pulse train via the AND circuit 248 and the OR circuit 257. Again an output appears on the wiring 152 from the binary multiplier 86 as the clock input to a binary coded decimal up/down counter, such as counter 154 (FIG. 3B) operates, via the drive circuit 30 (FIG. 3B) to advance again the electro-hydraulic pulse motor 27 (FIG. 3B) until the No. 1 feed rate enable signal disappears from the lead 217 in accordance with the predetermined program established for the control counter 45.

After the disappearance of the No. 1 feed rate enable signal from the lead 217 the control counter 45 establishes a No. 2 feed rate enable signal on the lead 218. The No. 2 feed rate enable signal on the lead 218 is coupled to the No. 2 feed rate selector switches 235 and 236 via the leads 233 and 234, respectively. Binary coded decimal signals again appear on the wirings 106 and 107 in accordance with the switches 235 and 236. The No. 2 feed rate enable signal is also coupled, via the lead 261, as an input to the AND circuit 258 which has its other input coupled via the lead 246 to receive a 40 KC pulse train from the pulse producing frequency divider 244. Upon the appearance of the enable signal on the lead 261, the 40 KC pulse train is passed through the AND circuit 258 to the lead 256 as an input to the OR circuit 257. The OR circuit 257, in turn, passes the 40 KC pulse train to the lead 243 thereby providing an input to the binary rate multiplier 86 which differs, by a factor of 10, from the 400 KC pulse train provided upon the occurrence of the first-mentioned three enable signals. Again an output from the binary rate multiplier 86 appears on the wiring 152 which, as before, may be used to advance an electro-hydraulic pulse motor for moving a machine element at a somewhat lower speed determined by the 40 KC pulse train and the binary coded decimal signals established by the settings of the feed rate switches 235 and 236.

The No. 2 feed rate enable signal remains on the leads 218 and a machine element (not illustrated in FIG. 5) continues to be advanced towards its final position until a diameter sensing device (not illustrated) supplies a signal to the control counter 45 indicating that the actual diameter of the workpiece W is a given diameter somewhat greater than the desired final diameter for the workpiece W. Upon receipt of a signal indicating the existence of the predetermined greater diameter than the final diameter for the workpiece W, the control counter acts to remove the No. 2 feed rate enable signal from the lead 218 and, as before, the clock input to a binary coded decimal up/down counter such as counter 154 (FIG. 3B) disappears from the wiring 152 and the electro-hydraulic pulse motor 27 (FIG. 3B) ceases to advance the machine element until a fine feed rate enable signal appears on the lead 219 from the sequence counter 45 in accordance with a desired program.

The fine feed rate enable signal which appears on the lead 219 is coupled respectively to fine feed rate switches 240 and 241 via the leads 237 and 238. In turn, the fine feed rate switches 240 and 241 provide as outputs to the wirings 106 and 107 binary coded decimal signals in accordance with the setting of the fine feed rate switches 240 and 241 previously established by the thumbwheels (not illustrated) associated with the fine feed rate switches 240 and 241. The binary coded decimal signals appearing on the wirings 106 and 107 provides an input to the binary rate multiplier 86.

The fine feed rate enable signal appearing on the lead 219 is coupled, via the lead 262, to an input of the AND circuit 260 thereby enabling the AND circuit 260 to pass a 4 KC pulse train from the lead 247 to the OR circuit 257 via the lead 264. Thus, a 4 KC pulse train appears on the lead 243 as a second input to the binary rate multiplier 86.

As before, an output from the binary rate multiplier 86 appears on the wiring 152 as the clock input to a binary coded decimal up/down counter, such as counter 154 (FIG. 3B) so that the drive circuit 30 (FIG. 3B) may be again activated thereby causing the electro-hydraulic pulse motor 27 (FIG. 3B) to rotate advancing, at a relatively slow fine feed rate, a machine element (not illustrated in FIG. 5).

The clock signal appearing on the wiring 152 continues, and the machine element advances until the diameter sensing device (not illustrated in FIG. 5) provides a signal to the control counter 45 indicating that the diameter of the workpiece W has been reduced to the final desired diameter. When the signal indicating that the final diameter of the workpiece W has been reached, the control counter 45 removes the fine feed rate enable signal from the lead 219, and the machine element (not illustrated in FIG. 5) ceases to advance. Thus, the desired cycle of operation is completed. It will be appreciated, in a grinding tool, that the machine element may be a grinding wheel support 12, and that the grinding wheel 13 need not necessarily be immediately retracted, but as a practical matter may be allowed to rotate for a short additional period of time, known as spark out time, to remove small irregularities which may remain on the ground surface of the workpiece W until the control counter 45 provides a signal, in accordance with the desired program, for retracting the grinding wheel 13.

To place the feed mechanism of FIG. 1 and the control system illustrated in FIG. 2 in condition for operation, the rate switches 55, the end point switches 56 and the dwell switches 57 are set in accordance with the desires of an operator, and power is supplied to the control system of FIG. 2 from a power supply (not illustrated). The workpiece W is positioned longitudinally of the bed 11 with a portion thereof to be ground spaced from and in alignment with the grinding wheel 13. An electric motor (not illustrated) is energized to place the grinding wheel 13 in rotation.

With the application of power to the control system illustrated in FIG. 2, the oscillator 65 starts to oscillate at a given frequency supplying an input to the rate generator 60 and the comparator 76.

To initiate a cycle of operation, the operator places a start signal on the lead 46 which causes the sequence control counter 45 to provide an enable rapid feed signal on the lead 36. The enable rapid feed signal causes the rapid feed valve controller 32 to supply hydraulic fluid to the cylinder 16 which acts on the piston 15 to slide the feed screw 14.

Because of the threaded engagement of the feed screw 14 with the thread engaging member 17 formed on the lower end of the anchor shaft 18, the grinding wheel support 12 moves rapidly advancing the grinding wheel 13 towards the workpiece W.

The grinding wheel support 12 continues to move rapidly advancing the grinding wheel 13 towards the workpiece W until the bracket 22 engages the switch 40 providing a start grinding wheel feed signal on the lead 41.

The appearance of the start grinding feed on the lead 41 causes the sequence control counter 45 to advance thereby removing the enable rapid feed signal from the lead 36 and placing an enable sidewall feed signal on the wiring 51 which appears on the wirings 52 and 53.

The sidewall feed signal on the wiring 52 is passed via the rate switches 55 and the wiring 58 to the rate generator 60 allowing the rate generator 60 to supply pulses of a predetermined repetition rate to the wiring 31 via the wiring 67.

The drive circuitry 30 receives the pulses from the wiring 31 causing the electro-hydraulic pulse motor 27 to rotate causing the grinding wheel support 12 to advance the rotating grinding wheel 13 so as to grind the sidewalls of the workpiece W.

The pulses which appear on the wiring 67 are also fed to the rate pulse counter 70 which, in turn, supplies an output signal on the wiring 71.

It will be appreciated that the signal which appears on the wiring 71 from the rate pulse counter 70 is indicative of the number of pulses applied to the electro-hydraulic pulse motor 27 as it advances the grinding wheel 13, and that the signals from the end point switches 56, as set by an operator, indicate a desired advance position of the grinding wheel 13.

The grinding of sidewalls of the workpiece W continues at a relatively high rate until the comparator 72, which compares signals received from the end point switches 56 and the pulse rate counter 70, indicates by a counter advance signal on the wiring 74 that a sufficient number of pulses have been applied to the electro-hydraulic pulse motor 27 to advance the grinding wheel 13 a particular distance determined by the end point switches 56.

The counter advance signal which appears on the wiring 74 is supplied to the sequence control counter 45 via the wiring 50 which, in turn, supplies a fast approach enable signal on the wiring 51 which is passed, via the wiring 52 and the rate switches 55, to the rate generator 60. In response to the receipt of the fast approach enable signal, the rate generator 60 supplies pulses having a somewhat lesser pulse repetition rate than the rate used during the sidewall feed.

The electro-hydraulic pulse motor 27 continues to advance the grinding wheel 13 and the workpiece W continues to be ground at a particular fast approach feed rate until the transducer 48, responding to an increase in current supplied to the electric motor (not illustrated) which rotates the grinding wheel 13, provides a signal on the lead 47 indicating that the principal grinding surface of the grinding wheel 13 has contacted a major surface of the workpiece W. The signal on the lead 47 causes the sequence control counter 45 to advance establishing a No. 1 feed rate enable signal on wiring 51.

The No. 1 feed enable signal from the wiring 51 is coupled respectively via the wirings 52 and 53 to the rate generator 60 and the end point selector 62 via the rate switches 55 and the end point switches 56, respectively.

The rate generator 60 supplies pulses, having a lower different repetition rate than the repetition rate used during the fast approach, to the electro-hydraulic pulse motor 27 via the wirings 67 and 31. The grinding wheel 13 continues to be advanced, now at the No. 1 feed rate, until the comparator 72 provides a counter advance signal on the wiring 74 indicating that the electro-hydraulic pulse motor 27 has been provided with a sufficient number of pulses to advance the grinding wheel 13 a particular distance determined by the setting of the end point switches 56. The counter advance signal which appears on the wiring 74 is supplied to the sequence control counter 45 via the wiring 74 causing the sequence control counter 45 to advance removing the No. 1 feed enable signal from the wirings 52 and 53. The disappearance of the enable signal from the wiring 52 results in the output pulses from the rate generator 60 being removed from the wiring 31 causing the electro-hydraulic pulse motor 27 to stop. Simultaneously, the sequence control counter 45 establishes a first dwell enable signal on the wiring 51. The first dwell enable signal on the wiring 51 is fed, via the wiring 54 to the dwell switches 57 which, in turn, supply a signal via the wiring 63 to the dwell selector 64.

The comparator 76 receives signals from the dwell selector 64, via wiring 77, and the crystal oscillator 65, via wiring 75, and is arranged to supply a counter advance signal, via the wiring 78 and the wiring 50, to the sequence control counter 45 upon the elapse of a dwell period which is established by the setting of the dwell switches 57 and determined by the number of signal cycles supplied to the comparator 76 from the crystal oscillator 65.

During the first dwell period, prior to the appearance of a counter advance signal from the comparator 76, the caliper 42 is moved into position, by conventional means (not illustrated) so that the probe 43 is in contact with the workpiece W. Also during the first dwell period, conventional steady rest (not illustrated) are moved into position about the workpiece W by conventional means (not illustrated).

Upon the occurence of the counter advance signal on the wiring 78 from the comparator 76, the sequence control counter 45 again advances removing the first dwell enable signal from the wiring 51 and, thus, the wiring 54 and establishing a No. 2 feed enable signal on the wiring 52.

The No. 2 feed enable signal is passed via rate switches 55 to the rate generator 60 enabling the rate generator 60 to provide pulses of a given repetition rate, via its output wiring 67 and the wiring 31, to drive circuitry 30 causing the electro-hydraulic pulse motor 27 to advance the grinding wheel 13 into the workpiece W at a rate somewhat less than the rate of advance established during the existance of the No. 1 feed rate enable signal.

The grinding wheel 13 continues to advance into the workpiece W until the caliper 42 senses that the portion of the workpiece W being ground has reached a predetermined diameter placing a signal on the lead 44 which caused the sequence control counter 45 to advance removing the No. 2 feed rate enable signal from the wiring 51, causing the output from the rate generator 60 to disappear from the wirings 67 and 31 effectively deenergizing the electro-hydraulic pulse motor 27 and halting the advance of the grinding wheel 13. Simultaneously, a second dwell enable signal is supplied from the sequence control counter 45 to the dwell switches 57 via the wirings 51 and 54.

The comparator 76 receives a signal from the dwell selector 64 via the wiring 77 and from the crystal oscillator 65 via the wiring 75. The grinding wheel 13 continues to rotate, but not advance thereby rounding out the already ground portion of the workpiece W. As before, the comparator 76 provides a counter advance signal, via the wiring 78 and the wiring 50, to the sequence control counter 45 upon the elapse of the second dwell period which is established by the setting of the dwell switches 57 and determined by the number of signal cycles supplied to the comparator 76 from the crystal oscillator 65.

Upon receipt of the counter advance signal from the comparator 76 at the end of the second dwell period, the sequence control counter 45 advances, removing the second dwell enable signal from the wirings 51 and 54. Additionally, the sequence control counter 45 provides a fine feed rate enable signal on the wiring 51 which signal is coupled, via the wiring 52 to the rate switches 55. The rate generator 60 receives a signal from the rate switches 55 via wiring 58 which enables it to supply another pulse signal, having a repetition rate related to the frequency of the crystal oscillator 65 and determined by the setting of the rate switches 55, to the wirings 67 and 31. The fine feed rate pulse signal on the wiring 31 is supplied to the electro-hydraulic pulse motor 27 via the drive circuitry 30 causing the grinding wheel 13 to advance again.

The electro-hydraulic pulse motor 27 continues to advance the grinding wheel 13 until the caliper 42 signals that the final diameter of the workpiece W being ground has been reached.

The sequence control counter 45, upon receipt of the signal from the caliper 42 via the lead 44 indicating that the final diameter of the portion of the workpiece W being ground has been sensed, removes the fine feed rate enable signal from the wiring 51. The rate generator 60 ceases to provide pulse signals to its wiring 67 thereby removing the input to the drive circuitry 30 from the wiring 31. The electro-hydraulic pulse motor 27 stops, and the grinding wheel 13 ceases to advance into the workpiece W. The sequence control counter 45 concurrently establishes a third dwell enable signal on the wiring 51 and thence via the wiring 54 to the dwell switches 57.

The comparator 76 receives signals from the dwell selector 64 via the wiring 77 and, as before, from the crystal oscillator 65 via the wiring 75. The grinding wheel 13 continues to rotate, but not advance, so as to remove any remaining small irregularities which may remain on the ground surface of the workpiece W during the third dwell period, known as a spark out time.

The comparator 76 again provides a counter advance signal to the sequence control counter 45 via the wirings 78 and 50 upon the elapse of the third dwell period (spark out time) causing the sequence control counter 45 to advance again thereby removing the third dwell enable signal from the wiring 51 and, thus, from the wiring 54.

Upon the advance of the sequence control counter 45 in response to the signal from the comparator 76 indicating the end of the third dwell period, the sequence control counter 45 responds to a signal on the lead 44 from the caliper 42 which now senses the final diameter of the portion of the workpiece W being ground. If the signal received from the caliper 42 indicates, as expected, that the diameter is correct, the sequence control counter 45 again advances, establishing a retract signal on the lead 37. If the signal received from the caliper 42 indicates that the diameter is oversize, the fine feed rate enable signal is again established and grinding continues until the caliper 42 signals that the correct diameter has been obtained. The spark out dwell sequence is again established, and the sequence control counter 45 again advances at the end of the spark out dwell period. Once again, the caliper 42 provides an output on the lead 44 indicative of the final diameter of the ground portion of the workpiece W, and the sequence control counter 45 establishes a retract signal on the lead 37.

The appearance of the retract signal on the lead 37, causes the rapid feed valve controller 32 to supply fluid to the cylinder 16 so as to drive the piston 15 in an opposite direction to its original direction thereby rapidly moving the grinding wheel support 12 and, thus, the grinding wheel 13 away from the workpiece W.

The grinding wheel support 12 continues to retract until a predetermined position is reached. A limit switch (not illustrated) carried by the bed 11 is actuated by a finger or bracket (not illustrated) carried by the grinding wheel support 12 to provide a signal at completion of the retracted movement of the grinding wheel support 12 in a conventional manner. It will be understood that the grinding wheel support 12 may again be advanced toward a workpiece W by a rapid feed movement provided by the piston 15 upon subsequent enabling of the rapid feed valve controller 32 by a signal on the lead 36.

When final size is reached, the wheel support 12 will reset a set distance as determined by the total feed end point switch which is part of the end point switches 56, as shown in FIG. 2.

The grind complete flip-flop which is a part of the sequence control counter 45 sends out the enable signal through the wiring 51 which enables the said total feed end point switch and the total feed rate switch 55 for total feed at the 1KC rate.

When the amount of total feed indicated by the rate pulse counter 70 is equal to the end point switches 56, indicated by the comparator 72, then the total enable signal through the wiring 52 is cut off and the rate generator output through wiring 67 going to the electro-hydraulic pulse motor 27 is stopped.

Thus, total feed reset is a set distance (total feed switches) from final size. It is always the amount set on the total feed switches from final size.

The operation and sequence of operation of the more specific control system illustrated in FIGS. 3A and 3B is very similar to the operation of the control system illustrated in FIG. 2 associated with the feed mechanism illustrated in FIG. 1. Since the major differences are simply the result of incorporation of the specific circuits illustrated in FIGS. 4 and 5, discussed in detail above, into the control system and feed mechanism shown in FIGS. 2 and 1, it is unnecessary to discuss the operation of the control system illustrated in FIGS. 3A and 3B in detail.

As illustrated in FIG. 3A, the rate generator 60 is composed of the range selector 84 and the binary rate multiplier 86 which is associated with the plurality of rate switches 87. The details of the operation of this portion of the circuitry of FIG. 3A is set out in detail above in discussing the operation of FIG. 5.

The operation of the up/down counters 147 through 151 and the associated end point switches 126 in association with the output appearing on the wiring 152 from the binary rate multiplier 86 is set out in detail above in discussing the operation of FIG. 4. It will be appreciated that during either one of the sidewall feed, the fast approach feed and No. 1 feed only five of the 15 end point switches 126 are provided with an enable feed from the sequence control counter 45 via the wirings 90, 91 and 92.

It is to be understood that a signal from the transducer 48 supplies a signal for advancing the sequence control counter 45 to end the fast approach and establish the No. 1 feed rate.

As illustrated, the end point switches 162–167 may supply binary coded signals to the comparators 137–141 by passing fast approach enable signals through contacts (not illustrated) within the switches 162–167 as an additional means for stopping the fast approach and establishing the No. 1 feed rate. In some instances, an operator may wish to use the end point switches 162–167 instead of the transducer 48. In most instances, the transducer 48 is used preempting the function of the end point switches 162–167 and their associated circuitry. The end point switches 162–167 may be effective to change feed rates in the event of a failure of the transducer 48.

In the system illustrated in FIGS. 3A and 3B the up/down counters 147–151 operate as do the up/down counters 270–274 illustrated in FIG. 4. In FIGS. 3A and 3B the up/down counters 147–151 are provided with output wirings 184–188 for the purpose of supplying binary coded decimal signals to the displays 190–194, respectively. The displays are operatively arranged to decode the binary coded decimal signals and visually display decimal numbers indicative of the diameter of the workpiece W as it is being ground.

It will be appreciated that the system illustrated in FIGS. 3A and 3B uses a binary coded decimal up/down counter 154 to process signals from the binary rate multiplier 86 and which, in turn, provides an input to the drive circuitry 30.

As illustrated in FIGS. 3A and 3B the control system includes an up/down counter 157 which receives as its down counting input pulses from the pulse generator 156 which indicate the actual advance of the pulse motor 27. Signals from the wiring 152 are applied to the up/down counter 157 as its up counting input. If the motor 27 is correctly advancing, the up/down counter 157 has a zero output. The counter 157 is arranged to provide an output signal on the lead 69 whenever the count difference is one hundred indicating that the electro-hydraulic pulse motor 27 is lagging. Upon the occurence of an output on the lead 69, the motor lag relay 59 is activated placing an emergency retract and/or an alarm signal on the lead 79. The signal on the lead 79 may be used to provide an emergency retract signal to a rapid feed valve controller, such as the rapid feed valve controller 32 shown in FIG. 1, to retract the grinding wheel 13 from the workpiece W. The output on the lead 69 or 79 may also be used to activate a visual indicator such as trouble light (not illustrated).

It will be understood that the emergency retract signal which may appear on the lead 79 may also be used, in a conventional manner, to remove the caliper 42 and the steady rests (not illustrated) from the workpiece W in the event the cycle of operation has advanced to a stage at which the steady rests (not illustrated) and the caliper 42 are in operative positions.

It is to be understood that although the invention has been specifically described in conjunction with a grinding wheel for a grinding machine, the invention is not so limited. The invention may be used with other types of machine tools as well.

While the embodiment illustrated in FIGS. 3A and 3B utilizes binary coded decimal signals, it will be readily appreciated that binary signals may be used in some applications. The use of binary coded decimal signal techniques are, of course, preferred in many applications because an operator may readily set the various switches and visual indicators are readily available which provides decimal numbers in response to binary coded decimal signals.

While the particular cycle of operation discussed, included three dwell periods, five different grinding feed rates and a rapid approach feed, it will be appreciated that more or fewer different grinding feed rates may be used and more dwell periods provided if desired. Further, in some applications the dwell periods may be entirely eliminated. The sequence controller 45, in a practical case, itself may be adjustable to add or subtract functions.

While preferred embodiments of the invention have been shown for purposes of illustration, it is to be understood that various changes in the details of construction and arrangement of the parts may be made without departing from the spirit and scope of the invention as defined in the appended claims.

What is claimed is:

1. In a machine tool, a rotatable pulse motor, means for applying first pulses to said pulse motor to effect rotation thereof, means responsive to rotation of said pulse motor for developing second pulse, and means responsive to said first and second pulses for developing an emergency signal whenever said pulse motor lags a predetermined amount.

2. The machine tool according to claim 1 including a machine element operatively arranged to be advanced by said pulse motor, and means responsive to said emergency signal for retracting said machine element upon the occurrence of said emergency signal.

3. In a machine tool including workpiece and tool supports and pulse driven means for effecting relative movement between such supports, in combination:

variable pulse rate generating means for driving said pulse driven means;

pulse counting means for counting the number of pulses supplied by said pulse generating means to said pulse driven means;

a plurality of pulse rate control means for selectively controlling the pulse rate output of said pulse generating means;

a plurality of end point switch means for producing different digital number outputs corresponding to different relative positions between said workpiece and tool supports;

comparator means for comparing the number output of selected end point switch means and the output of said pulse counting means periodically to produce an advance signal;

sequence control means responsive to an advance signal for sequentially enabling different ones of said end point switch means and different ones of said pulse rate control means whereby to initiate progressive steps of relative movements between said supports.

4. In a machine tool including workpiece and tool supports and pulse driven means for effecting relative movement between such supports, in combination:

variable pulse rate generating means for driving said pulse driven means;

means for effecting reverse drive to said pulse driven means at the end of a machining operation to position said supports in predetermined starting position;

pulse counting means for counting the number of pulses supplied by said pulse generating means to said pulse driven means during operation of the latter in forward direction commencing from said starting position of relative movement between said supports;

a plurality of manually set end point switch means for producing digital number outputs corresponding to different relative positions between said supports which are between said starting position and that position attained at the end of a machining operation;

comparator means for comparing the number output of a selected end point switch means and the output of said pulse counting means and at coincidence therebetween to produce an advance signal;

sequence control means responsive to each advance signal for producing an enabling signal sequentially enabling different ones of said end point switch means whereby to initiate progressive steps of relative movements between said supports at said different relative positions to which said end points switch means are set;

caliper means for measuring the size of a workpiece as it is being machined and having an output connected to said sequence control means for producing other enabling signals initiating other progressive steps of relative movements between said supports; and means responsive to said enabling signals for selectively controlling the rate output of said pulse generating means.

5. In a machine tool including workpiece and tool supports and pulse driven means for effecting relative movement between such supports, a tool carried by said tool support, in combination:

variable rate pulse generating means for driving said pulse driven means in forward and reverse directions respectively to advance and to retract said supports;

means for causing said pulse generating means to retract said supports a predetermined distance to a starting position in response to attainment of a predetermined advance position thereof corresponding to a position at which machining of a workpiece is terminated;

rate control means for selectively adjusting the pulse rate output of said pulse generating means;

sequence control means responsive to advance signals corresponding to attainment of different positions between said starting position and said position at which machining is terminated for actuating said rate control means to effect progressive advance movements of different rates;

transducer means for producing an advance signal in response to contact between the tool and a workpiece whereby to actuate said sequence control means;

manually set end point switch means for producing different digital number outputs corresponding to different relative positions of said supports;

pulse counting means for counting pulses supplied by said pulse generating means commencing from said starting position;

comparator means for comparing the number output of selected end point switch means and the output of said pulse counting means periodically to produce an advance signal whereby to actuate said sequence control means; and caliper means for measuring the size of a workpiece to produce comparison numbers to provide at least a further advance signal to actuate said sequence control means and a signal for actuating said means for causing said pulse generating means to retract said supports.

6. In a machine tool as defined in claim 5 including a second pulse generating means actuated by said pulse driven means for producing a pulse output in accord with movement produced by said pulse driven means; counter means driven in opposite senses respectively by the output of the first pulse generating means and by the output of said second pulse generating means; and means responsive to output of said counter means indicative of predetermined lag of said pulse driven means for effecting emergency retractions between said supports.

7. In a machine tool as defined in claim 4 including a second pulse generating means actuated by said pulse driven means for producing a pulse output in accord with movement produced by said pulse driven means; counter means driven in opposite senses respectively by the output of the first pulse generating means and by the output of said second pulse generating means; and means responsive to output of said counter means indicative of predetermined lag of said pulse driven means for effecting emergency retractions between said supports.

8. In a machine tool as defined in claim 3 including a second pulse generating means actuated by said pulse driven means for producing a pulse output in accord with movement produced by said pulse driven means: counter means driven in opposite senses respectively by the output of the first pulse generating means and by the output of said second pulse generating means; and means responsive to output of said counter means indicative of predetermined lag of said pulse driven means for effecting emergency retractions between said supports.

9. In a machine tool as defined in claim 3 wherein said pulse generating means includes an oscillator and means for providing signals at fixed frequencies related to the frequency of the oscillator; means for causing dwell between at least some progressive steps of relative movement between said supports and comprising a pulse counter connected to one of the fixed frequency outputs of said pulse generating means, a comparator, and manually set means for producing a selected digital number output, said comparator being connected to said pulse counter and said manually set means to produce an advance signal upon match therebetween.

10. In a machine tool as defined in claim 4 wherein said pulse generating means includes an oscillator and means for providing signals at fixed frequencies related to the frequency of the oscillator; means for causing dwell between at least some progressive steps of relative movement between said supports and comprising a pulse counter connected to one of the fixed frequency outputs of said pulse generating means, a comparator, and manually set means for producing a selected digital number output, said comparator being connected to said pulse counter and said manually set means to produce an advance signal upon match therebetween.

11. In a machine tool as defined in claim 5 wherein said pulse generating means includes an oscillator and means for providing signals at fixed frequencies related to the frequency of the oscillator; means for causing dwell between at least some progressive steps of relative movement between said supports and comprising a pulse counter connected to one of the fixed frequency outputs of said pulse generating means, a comparator, and manually set means for producing a selected digital number output, said comparator being connected to said pulse counter and said manually set means to produce an advance signal upon match therebetween.

12. In a machine tool as defined in claim 3 including a grinding wheel carried by said tool support.

13. In a machine tool as defined in claim 4 including a grinding wheel carried by said tool support.

14. In a machine tool as defined in claim 5 including a grinding wheel carried by said tool support.

* * * * *